Jan. 31, 1967     M. D. COY     3,301,092
TRANSMISSION CONTROLS
Filed Sept. 3, 1963
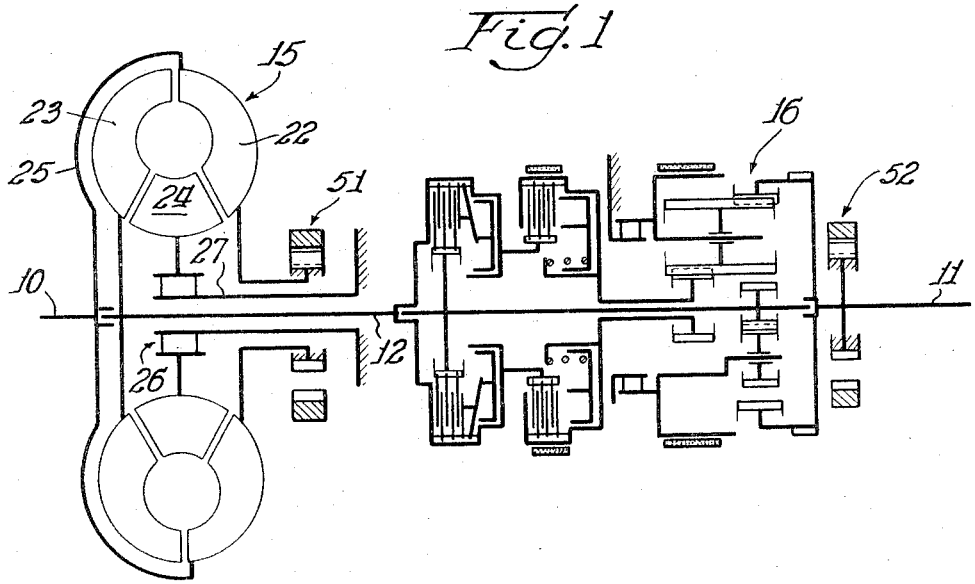
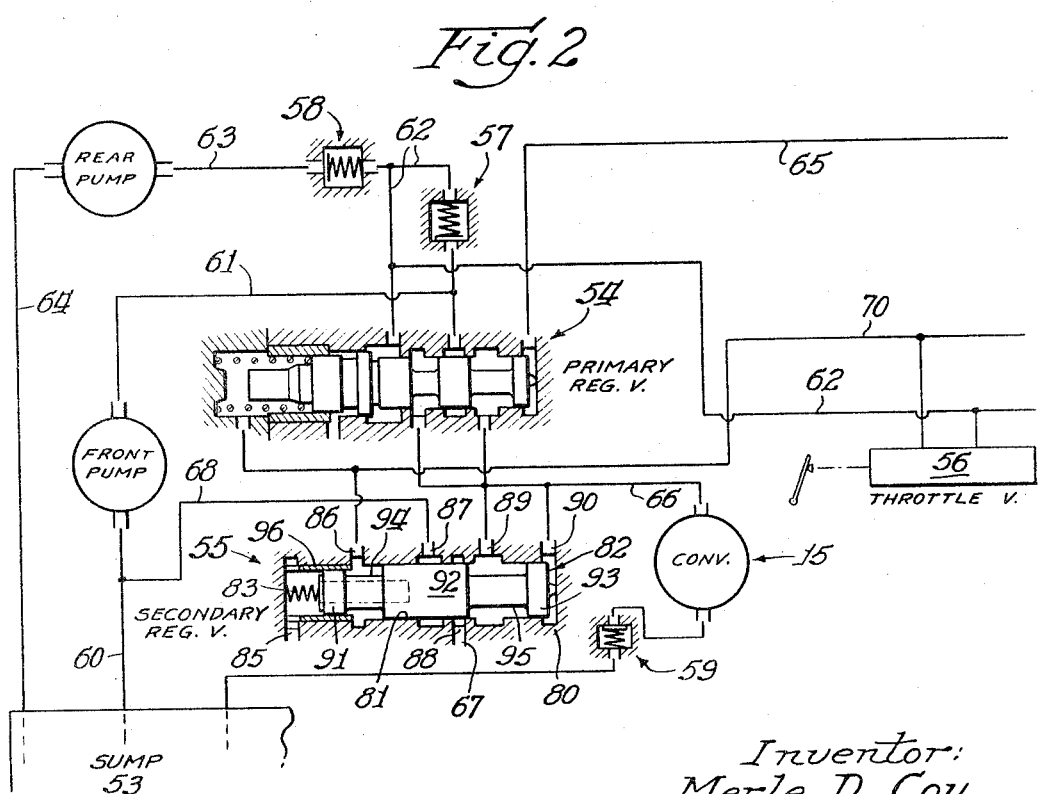
Inventor:
Merle D. Coy
By: Robert L. Zieg Atty United States Patent Office 3,301,092
Patented Jan. 31, 1967

3,301,092
TRANSMISSION CONTROLS
Merle D. Coy, Muncie, Ind., assignor to Borg-Warner Corporation, Chicago, Ill., a corporation of Illinois
Filed Sept. 3, 1963, Ser. No. 306,094
3 Claims. (Cl. 74—645)

This invention relates to an automatic transmission control system for use in an automotive vehicle.

More particularly this invention relates to the fluid pressure supply and regulation section of a control system for an automatic transmission wherein the fluid pressure supplied to the torque converter of the transmission is regulated in accordance with the throttle position.

One of the problems existing in automatic transmissions utilizing a hydraulic torque converter is that of noise and inefficiency within the torque converter when the pressure of the fluid supplied to the converter is below a certain level. If the pressure of the fluid supplied to the converter is not high enough, cavitation will exist which will create noise and foaming of the oil, resulting in inefficiency. It has been found that, if the pressure in the converter is maintained to a high enough value to prevent the cavitation and noise problems, the connection between the engine of the vehicle and the transmission will be too rigid when the transmission is shifted from neutral to drive and the friction elements within the transmission are engaged, and a rough or jerky shift from neutral to drive results.

Accordingly, it is the object of this invention to provide an improved control system for an automatic transmission including a secondary regulator valve which will regulate the fluid pressure within the hydraulic torque converter in dependence upon the position of the throttle, whereby the pressure in the converter will be such that a smooth neutral to drive shift may be made when the throttle is in the released position, and adequate fluid pressure will be maintained in the supply conduit of the converter to prevent cavitation and noise when the throttle is depressed to accelerate the vehicle.

The invention consists of the novel construction, arrangements and devices to be hereinafter described and claimed for carrying out the above-stated objects, and such other objects as will be apparent from the following description of a preferred form of the invention, illustrated with reference to the accompanying drawings, wherein:

FIG. 1 is a longitudinal sectional view of a transmission mechanism with which the improved controls of the present invention are intended to be used, and FIG. 2 is a schematic diagram of the fluid supply and pressure regulation section of the control system for the transmission mechanism.

Referring to FIG. 1, a transmission mechanism with which the improved controls of the present invention are intended to be used is shown and comprises a drive shaft 10, a driven shaft 11, and an intermediate shaft 12, all of these shafts coaxially aligned. The transmission mechanism also comprises a torque converter 15 and a planetary gear set 16 connected to be driven by the torque converter 15 through the intermediate shaft 12.

The torque converter 15 comprises a bladed driving element or impeller 22, a bladed driven element or turbine 23 and a bladed reactor member or stator 24. The impeller 22 is connected by means of a shroud 25 to the drive shaft 10. The turbine 23 is splined to the intermediate shaft 12 and the stator 24 is connected through a one-way brake 26 to the sleeve shaft 27, which is anchored to the transmission casing.

The planetary gear set 16 provides three forward drive ratios, neutral and reverse, and is more particularly described in copending applications S.N. 12,771, filed on March 4, 1960, now Patent No. 3,117,464, and S.N. 138,858, filed on September 18, 1961, now Patent No. 3,136,175, of common assignee.

The complete hydraulic control system for the above-mentioned transmission is particularly described in the copending applications mentioned above. The description and disclosure of this invention is concerned only with the fluid supply and pressure regulation section of the control system, illustrated in FIG. 2.

The fluid supply and regulation section of the hydraulic control system for the transmission comprises an engine driven front pump 51 and a rear pump 52 adapted to be driven by the driven shaft 11. Fluid for supplying the converter 15 and the control system is contained within a sump 53. The control system also includes a primary regulator valve 54, a secondary regulator valve 55, a throttle valve 56, front pump check valve 57, rear pump check valve 58, and converter relief check valve 59.

The front pump 51 is connected by means of a conduit 60 to the sump 53 and by means of a conduit 61 to the primary regulator valve 54 and the front pump check valve 57. The front pump check valve 57 is connected by means of a conduit 62 to the rear pump check valve 58 and the primary main regulator valve 54. The rear pump 52 is connected by means of a conduit 63 to the rear pump check valve 58 and by means of conduit 64 to the sump 53.

The primary regulator valve 54 is connected to the modulator pressure conduit 65 and is also connected by means of a torque converter supply conduit 66 to the converter 15 and to the secondary regulator valve 55. The secondary regulator valve 55 is connected to a conduit 67 for supply lubricating fluid to the transmission mechanism, and through a conduit 68 to the suction line 60 for the front pump 51. The throttle valve 56 is connected to the conduit 62 and by means of a conduit 70 to the primary regulator valve 54 and the secondary regulator valve 55.

The novel secondary regulator valve 55 of the present invention functions to regulate converter pressure and comprises a casing 80 formed with a longitudinal cylindrical bore 81, a valve piston 82 and a valve spring 83. The casing 80 is formed with ports 85, 86, 87, 88, 89 and 90, all opening into the bore 81. The valve piston 82 is formed with lands 91, 92 and 93. Annular groove 94 is formed between the lands 91 and 92 and annular groove 95 is formed between the lands 92 and 93. The land 91 of the valve piston 82 slides within a sleeve 96 fixed within the cylindrical bore 81. The port 85 is an exhaust port. Port 86 is connected to the throttle pressure conduit 70, port 87 is connected to the conduit 68, port 88 is connected to the lubrication conduit 67, and ports 89 and 90 are connected to the conduit 66.

The spring 83 urges the valve piston 82 to the right, as viewed in FIG. 2. Land 92 on the valve piston is larger than the land 91 whereby fluid pressure within the annular groove 94 will act on the differential area between the lands 92 and 91, and also urge the valve piston 82 to the right.

In operation the fluid pressure supply and regulating section of the control system for the transmission functions as follows: When the engine is running, fluid is drawn from the sump 53 by the front pump 51 and is delivered through conduit 60 and the front pump check valve 57 (closing the rear pump check valve 58) into conduit 61 to the primary regulator valve 54, the throttle valve 56 and other valves of the hydraulic control circuit (not illustrated).

At some stage of the operation when the speed of the driven shaft 11 increases the rear pump 52 takes over the function of supplying fluid for the control system. In this condition the rear pump draws fluid from the sump 53 through conduit 64 and discharges the fluid through the conduit 63, through the check valve 58 and into the conduit 62. This fluid pressure is also effective to close the front pump check valve 51.

The primary regulator valve 54 functions to regulate the pressure developed by the pump 51 in dependence upon the value of the modulator pressure supplied to the right hand end thereof through conduit 65 and the throttle pressure imposed on the left-hand end thereof supplied by conduit 70. The primary regulator valve regulates the line pressure into conduit 62, which is the main line pressure supply conduit for the control system of the transmission. The modulator pressure in conduit 65 is a pressure produced by a modulator valve (not illustrated) in dependence upon the value of the throttle pressure and the speed of the driven shaft.

The throttle valve 56 received line pressure through conduit 62 and serves to produce a pressure in conduit 70 that increases with the amount of depression of the throttle pedal and is referred to as throttle pressure.

Throttle pressure is supplied by the throttle valve 56 through the conduit 70 to the port 86 and annular groove 94 of the valve piston 82. Throttle pressure will act on the differential area between the lands 91 and 92 and supplement the force of the spring 83 in urging the valve piston 82 to the right.

For a more detailed description of the operation of the primary regulator valve 54, the throttle valve 56, and the development of the modulator pressure in conduit 63, reference can be had to the above-mentioned copending applications of common assignee.

The operation of the novel and improved secondary regulator valve 55 is as follows: Line pressure is supplied to the ports 89 and 90 of the secondary regulator valve and the converter 15 through conduit 66 by the primary regulator valve 54. The pressure acting against the land 93 on the valve piston 82 forces the piston 82 toward the left, as shown in FIG. 2, against the action of the spring 83. As the piston 82 moves to the left, port 88 is opened and fluid is permitted to pass from the port 89 through the groove 95 and out through the port 88 and conduit 61 for lubricating the rotating parts of the transmission.

Release of fluid through the port 88 causes the pressure within conduit 66 to drop until the force developed by the spring 83 and the force of throttle pressure acting on the differential area of lands 91 and 92 is exactly balanced by the pressure acting against the land 93. The secondary regulator valve will therefore regulate the fluid pressure in the converter supply conduit 66 to a value in dependence upon the strength of the spring 83 and the fluid pressure within the throttle pressure conduit 70.

If the pressure in the conduit 66 rises sufficiently high the valve piston 82 will move further to the left so as to open the port 87 and permit draining of the fluid from the port 89 through the groove 95, port 87, and conduit 68 to the conduit 60.

Since the valve piston 82 of the secondary regulator valve 55 moves further to the right with increasing throttle pressure supplied to the groove 94, the pressure supplied by the conduit 66 to the converter 15 will increase with the amount of depression of the throttle pedal. Thus, the novel secondary regulator valve 55 provides sufficient fluid pressure within the converter 15 at all times to prevent cavitation and noise which would result from inadequate fluid pressure within the converter 15. Also, the problem of a harsh or jerky shift when shifting from neutral to drive is eliminated, since at this time the throttle pedal is normally in its relaxed position and the fluid pressure within the converter at this time is regulated to a minimum value since no throttle pressure will be exerted on the differential areas between lands 91 and 92 of the valve piston 82.

From the above it will be apparent that by means of the novel and improved secondary regulator valve for regulating the pressure within the torque converter 15 applicant has provided a simple and efficient means of reducing noise and cavitation within the torque converter while at the same time providing a smooth neutral to drive shift. Further the secondary regulator valve regulating the fluid pressure within the converter 15 is located in the pressure supply conduit to the converter 15, rather than on the outlet side of the converter and provides a more precise control over the fluid pressure within the converter than would be possible if the regulator valve was on the fluid outlet side of the converter.

It is to be understood that the invention is not to be limited to specific constructions and arrangements shown and described, except only insofar as the claims may be so limited, as it will be understood to those skilled in the art that changes may be made without departing from the principles of the invention.

I claim:

1. In a transmission mechanism for an automotive vehicle including a hydraulic torque converter, an engine and a throttle actuator for controlling the engine, a hydraulic control system for said transmission including a source of fluid pressure, a line pressure supply conduit for said controls, a primary regulator valve connected to said source of fluid pressure and to said line pressure supply conduit, said primary regulator valve adapted to regulate the fluid pressure in said line pressure conduit, a secondary regulator valve connected to said primary regulator valve and to said torque converter, a throttle valve connected to said line pressure conduit and connected to supply a fluid pressure to said primary and secondary regulator valves which increases with increasing depression of the throttle actuator, said secondary regulator valve being adapted to regulate fluid pressure supplied to said hydraulic torque converter to a pressure proportional to the pressure supplied from said throttle valve.

2. In a transmission mechanism for an automotive vehicle including a hydraulic torque converter, an engine and a throttle actuator for controlling the engine, a hydraulic control system for said transmission including a source of fluid pressure, a line pressure supply conduit for said controls, a primary regulator valve connected to said source of fluid pressure and to said line pressure supply conduit, said primary regulator valve adapted to regulate the fluid pressure in said line pressure conduit, a secondary regulator valve connected to said primary regulator valve and to said torque converter, a throttle valve connected to said line pressure conduit and connected to supply a fluid pressure to said primary and secondary regulator valves which increases with increasing depression of the throttle actuator, said secondary regulator valve having two lands of differential area subjected to said fluid pressure from said throttle valve whereby the fluid pressure supplied to said hydraulic torque converter is regulated to a pressure proportional to the pressure supplied from said throttle valve.

3. In a transmission mechanism for an automotive vehicle including a hydraulic torque converter, an engine and a throttle actuator for controlling the engine, a hydraulic control system for said transmission including a source of fluid pressure, a line pressure supply conduit for said controls, a primary regulator valve connected to said source of fluid pressure and to said line pressure supply conduit, said primary regulator valve adapted to regulate the fluid pressure in said line pressure conduit, a secondary regulator valve connected to said primary regulator valve and to said torque converter by a torque converter supply conduit, a throttle valve connected to said line pressure conduit and connected by a throttle pressure conduit to supply a fluid pressure to said primary and secondary regulator valves which increases with increasing depression of the throttle actuator, said secondary regulator valve having a valve piston and a spring urging said valve piston in a first direction, said valve piston having two lands of differential area thereon connected to said throttle pressure conduit, the fluid pressure in said throttle pressure conduit acting on said lands of differential area to also urge said valve piston in said first direction, a third land on said valve piston connected to said torque converter supply conduit, the fluid pressure in said torque converter supply conduit acting on said third land to urge said valve piston in a direction opposite to said first direction whereby said secondary regulator valve will regulate the fluid pressure in the torque converter supply conduit to a pressure proportional to the valve of the fluid pressure to the pressure supplied by said throttle valve in said throttle pressure conduit.

References Cited by the Examiner
UNITED STATES PATENTS

| | | |
|---|---|---|
| 3,023,636 | 3/1962 | Kelley et al. |
| 3,165,946 | 1/1965 | Wayman. |

DAVID J. WILLIAMOWSKY, *Primary Examiner.*

DON A. WAITE, *Examiner.*

M. H. FREEMAN, *Assistant Examiner.*